R. H. VILLARD.
COUPLING FOR SECTIONAL RODS.
APPLICATION FILED SEPT. 18, 1906.
921,487.
Patented May 11, 1909.
2 SHEETS—SHEET 1.
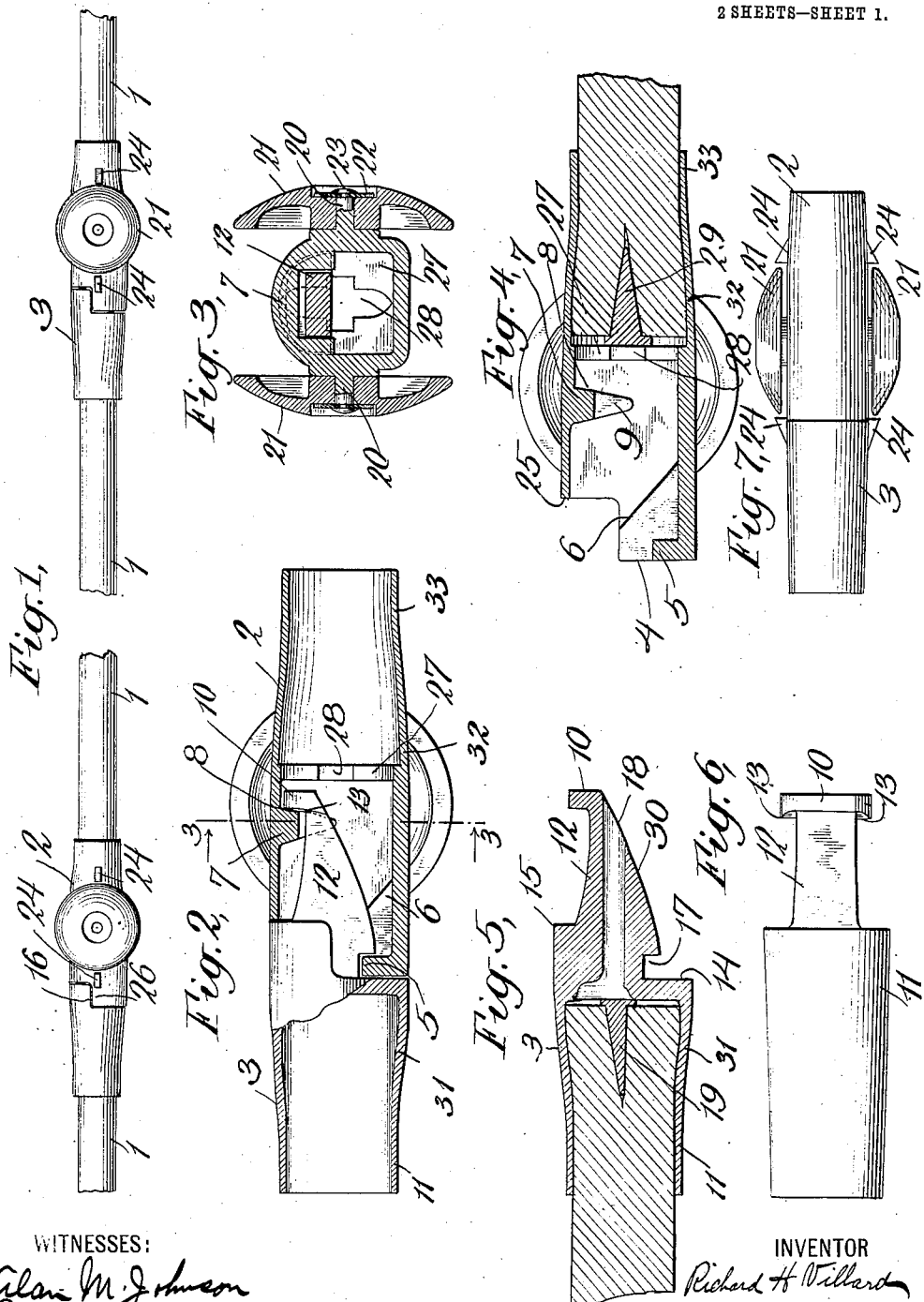
WITNESSES:
Alan M. Johnson
Jessie B. Kay.
INVENTOR
Richard H. Villard
BY
Duncan & Duncan
ATTORNEY R. H. VILLARD.
COUPLING FOR SECTIONAL RODS.
APPLICATION FILED SEPT. 18, 1906.
921,487.
Patented May 11, 1909.
2 SHEETS—SHEET 2.
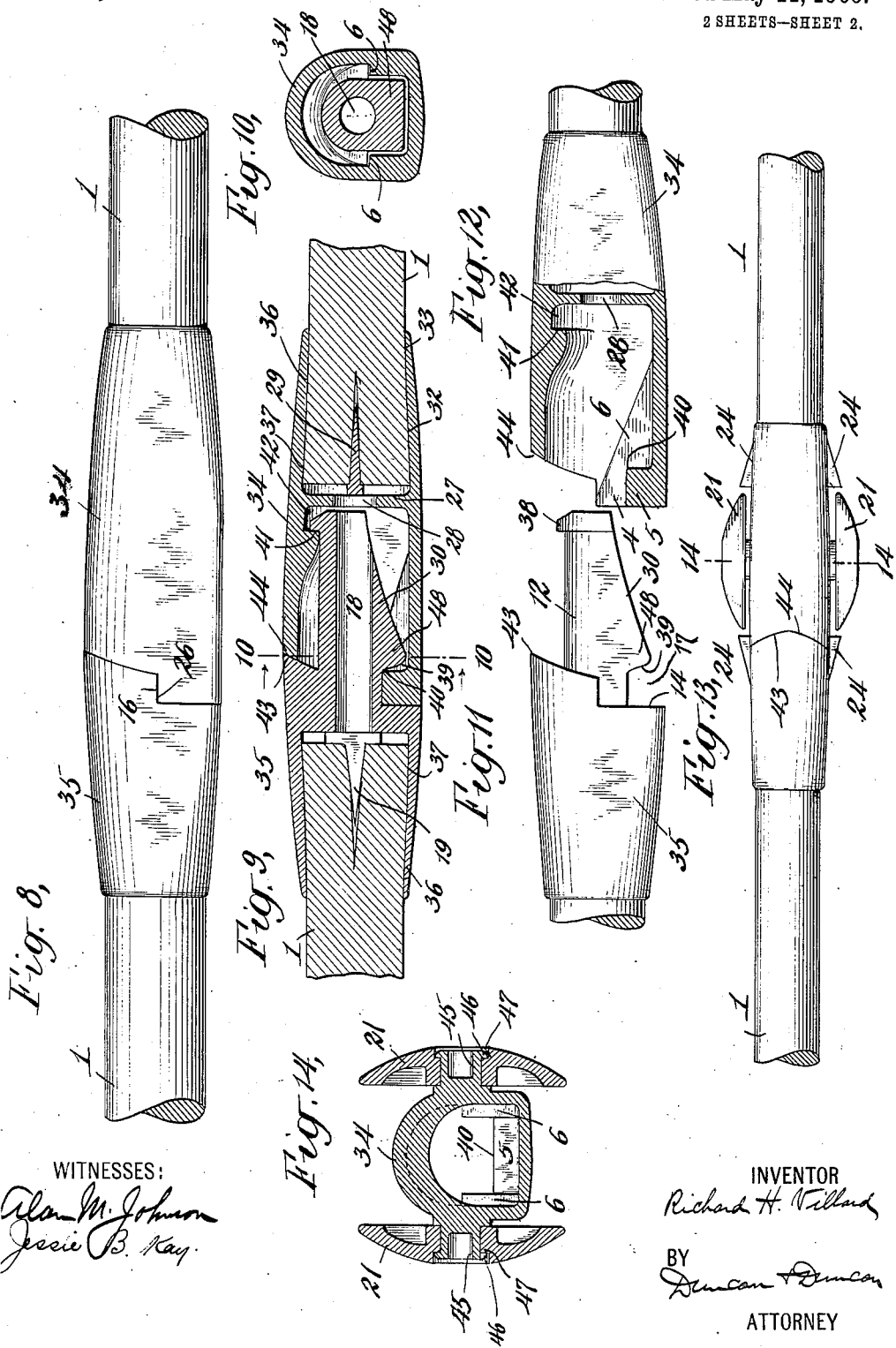
WITNESSES:
Alan M. Johnson
Jessie B. Kay.
INVENTOR
Richard H. Villard,
BY
Duncan & Duncan
ATTORNEY

UNITED STATES PATENT OFFICE.

RICHARD H. VILLARD, OF ROCHESTER, NEW YORK, ASSIGNOR TO THE DIAMOND EXPANSION BOLT COMPANY, OF NEW YORK, N. Y., A CORPORATION OF NEW YORK.

COUPLING FOR SECTIONAL RODS.

No. 921,487.     Specification of Letters Patent.     Patented May 11, 1909.

Application filed September 18, 1906. Serial No. 335,085.

*To all whom it may concern:*

Be it known that I, RICHARD H. VILLARD, a citizen of the United States, and a resident of Rochester, in the county of Monroe and State of New York, have invented certain new and useful Improvements in Couplings for Sectional Rods, of which the following is a specification, taken in connection with the accompanying drawings, which form a part of the same.

My invention relates to that class of couplings for sectional rods used in underground conduits and is an improvement upon my Patent 684,732, patented October 15, 1901.

In the accompanying drawings showing illustrative embodiments of this invention in which the same reference numeral refers to similar parts in the several figures, Figure 1 is a side elevation of a coupling rod embodying my invention. Fig. 2 is a longitudinal vertical section through one of the couplings. Fig. 3 is a transverse vertical section on line 3—3 of Fig. 2. Fig. 4 is a longitudinal vertical section of a female coupling member. Fig. 5 is a longitudinal vertical section of the male coupling member. Fig. 6 is a plan of the male coupling member. Fig. 7 is a plan of the coupling showing the male and female members in operative position. Fig. 8 is a side elevation of my preferred form of coupling. Fig. 9 is a longitudinal vertical section through the coupling, shown in Fig. 8. Fig. 10 is a transverse vertical section on line 10—10 of Fig. 9. Fig. 11 is a side elevation of the male coupling member. Fig. 12 is a side elevation, partly in vertical section, of the female coupling member. Fig. 13 is a plan view of the male and female members shown in operative position. Fig. 14 is a transverse vertical section substantially on line 14—14 of Fig. 13.

In the illustrative embodiments of this invention shown in the drawings, 1 is a rod upon one end of which is mounted the female coupling 2 and on the other end the male coupling 3. This female coupling member is shown provided with an abutment 4 which is cut away in the center to form a vertically extending lip 5. Within this coupling member are guides 6 upon either side of the lip 5 (see Figs. 2 and 4) and depending from the upper portion of the interior of the coupling is a wedge-shaped locking lug 7 having the inclined surface 8, which is cut away at 9, to permit tooth 10 of the male coupling member 3 to engage with the inclined surface 8 of the locking lug 7. This male coupling member 3 consists of a substantially hollow cylindrical portion 11 and the enlarged hollow conical portion 31 from which extends the head 12, upon which is mounted the tooth 10; upon either side of the head 12 this tooth has the inclined wings 13, 13, Fig. 6. Between the conical portion 31 of the member and the head I provide the vertical abutments 14, 15 Fig. 5, and the horizontal shoulders 16, Fig. 1, preferably forming 14 and 15 in different planes. I also preferably form the lower side of the head 12 inclined, as shown at 30. Between this inclined surface 30 and the vertical abutment 14 I form a locking recess 17 and I provide the head 12 with an orifice 18 so that a pin or other suitable instrument may be inserted therein to contact with a wedge 19 in the end of the rod 1 so that suitable pressure may be brought to bear upon the wedge to expand the ends of the rod 1 against the interior surface of the conical portion 31, making a firm connection between the rod 1 and the male coupling member 3.

I have shown the female coupling member 2 provided with trunnions 20—20 Fig. 3, upon which I may mount the anti-friction wheels 21, 21 secured upon the trunnions by the washers 22 held in position by means of the screws 23. To assist the couplings passing any obstruction that may be in the conduit I preferably employ guide lugs 24, 24 on either side of the female coupling member which will coöperate with the anti-friction wheels 21, 21 and permit the coupling rod being forced past the obstruction. I may also cast or otherwise secure in the coupling member 3 a plate 27 having an aperture 28 through which any suitable tool may be inserted to force the wedge 29 into the end of the rod 1, expanding it until it engages with the hollow conical portion 32 of the female coupling 2 which also has a cylindrical portion 33.

To make quick and rigid connection, all that is necessary is to place the head 12 of the male coupling 2 within the female coupling 2 and bring the tooth and wings 13, 13 into contact with the inclined surface 8 of the locking lug 7. Downward pressure on the members to bring them into horizontal alinement, will cause the tooth 10 and wings 13, 13 to move on the inclined surface 8 of the locking lug 7, bringing the two coupling members 2 and 3 closely together and causing the lip 5 of the coupling 2 to engage in the locking recess 17 of the coupling member 3, and at the same time bringing the vertical abutments 4 and 25 of the female member into contact respectively with the vertical abutments 14 and 15 of the male member, the horizontal shoulders 26 of the female member 2 being at the same time brought into engagement with the horizontal shoulders 16 of the male member 3.

In the preferred form of my coupling shown in Figs. 8 to 14, I provide the hollow part of the male member 35 with the cylindrical portion 36, and the conical portion 37, from which extends the head 12, carrying the vertical tooth 38. A recess 17 is provided on the under surface of the head between the vertical abutment 14, and the wedge surface 39 of the boss 48. The abutment 43 of the conical portion 37 is preferably both undercut and convex as shown in Figs. 9, 11 and 13 and engages with the complementary concave surface 44 of the female coupling 34. This latter coupling is formed hollow, a portion 33 of its interior surface being shown cylindrical, and a portion 32 conical; within the conical portion is mounted the end of rod 1, which is expanded by means of the wedge 29, by a suitable tool, (not shown) passing through the opening 28 in the plate 27. It is to be understood of course, that all the wedges such as 19 and 29 are inserted in slots or kerfs in the ends of the wooden rods 1, 1 before the ends of the wooden rods are introduced into the metal couplings. Instead, however, of providing a wedge shaped locking lug to coöperate with the tooth 38, of the head 12, I form an angular locking lug 41 upon the interior surface of the female locking member 34 to engage with the tooth 38 carried by the head 12. In this preferred form, I obtain a wedging action by placing the wedge or inclined surface 39 upon the boss 48 of the head 12, permitting it to coöperate with the surface 40 of the upwardly extending lip 5. In this preferred form I may cast the hollow trunnions 45, directly on the female member 34, and after the anti-friction wheels 21 are seated upon the same, the ends of the trunnions can be upset as shown at 46 by any suitable tool, so as to engage in the recesses 47, of the anti-friction wheels and securely hold them in position, it being understood of course, that the female member may be used either with anti-friction rollers and guide lugs 24, as shown in Fig. 13, or without them as shown in Fig. 8. In this form of my invention, it is merely necessary to insert the head 12 into the female coupling 34, until the tooth 38 is located in the recess 42 formed by the plate 27 and the lug 41, when downward movement upon the coupling members to bring them into alinement, will cause the wedge surface 39 to coöperate with the surface 40 of the lip 5, causing the tooth 38 to engage with the lug 41, and firmly lock the coupling members together, as shown in Figs. 8 and 9.

By the use of this invention coupling rods are firmly and rigidly connected together and the parts are so arranged that a firm and rigid connection is made the moment that the male coupling member is placed within the female coupling member and brought to its seat.

Having thus described this invention in connection with several illustrative embodiments thereof, to the details of which I do not desire to be limited, what is claimed as new and what is desired to secure by Letters Patent is set forth in the appended claims.

1. In a device of the character described, the combination of a hollow substantially cylindrical female coupling member, a rigid lip substantially at the end of the female member, a locking lug mounted within the female member and protected by the walls of said member, a plurality of substantially vertical abutments on said female member, a substantially cylindrical male coupling member having a head, a tooth carried by the head to coöperate with the lug carried by the female member, said male member having a locking recess to coöperate with the lip carried by the female member, and a plurality of substantially vertical abutments on the male member to coöperate with the substantially vertical abutments carried by the female member.

2. In a device of the character described, the combination of a hollow substantially cylindrical female coupling member, a rigid lip carried by the female member, a locking lug mounted within the female member and protected by the walls of said member, a plurality of abutments on said female member, a substantially cylindrical male coupling member having a head, a tooth carried by the head to coöperate with the lug carried by the female member, said male member having a locking recess to coöperate with the lip carried by the female member, a plurality of abutments carried by the male member to coöperate with abutments carried by the female member and substantially horizontal shoulders on the male and female members.

3. In a device of the character described, the combination with a male locking member consisting of a hollow cylindrical portion and a hollow conical portion, a head extending out from the conical portion and provided with an orifice, a tooth upon the end of the head, there being a locking recess in the male coupling, a female locking member, having a lip to coöperate with the locking recess of the male coupling, a lip carried by the female member, to coöperate with the tooth of the male coupling member.

4. In a device of the character described, a hollow male coupling member having a substantially cylindrical, and a substantially conical interior surface; a head provided with an orifice, a locking tooth, and an inclined or wedge surface and a locking recess; a hollow female locking member having a substantially cylindrical and a substantially conical interior surface; a plate provided with an opening in said female member; a downwardly extending lug to engage with the tooth carried by the head; and an upwardly extending lip to coöperate with the recess carried by the head.

5. In a device of the character described, a hollow male coupling member having a substantially cylindrical and a substantially conical interior surface; a head provided with an orifice through the head, a locking tooth, an inclined or wedge surface, and a locking recess; a hollow female locking member having a substantially cylindrical and a substantially conical interior surface, a plate provided with an opening in said female member, a downwardly extending lug to engage with the tooth carried by the head, an upwardly extending lip to coöperate with the recess carried by the head, a convex abutment carried by the male member and a concave abutment carried by the female member to coöperate with it.

6. In a device of the character described, a hollow male coupling member having a substantially cylindrical and a substantially conical interior surface, a head provided with an orifice through the head, a locking tooth, an inclined or wedge surface, and a locking recess, a hollow female locking member having a substantially cylindrical and a substantially conical interior surface, a plate provided with an opening in said female member, a downwardly extending lug to engage with the tooth carried by the head, an upwardly extending lip to coöperate with the recess carried by the head, one of the coupling members being provided with integral trunnions, anti-friction wheels mounted on the trunnions and means for fastening the anti-friction wheels on said trunnions.

7. In a device of the character described, a hollow male coupling member having a substantially cylindrical and a substantially conical interior surface, a head having an orifice, a locking tooth, an inclined or wedge surface, and a locking recess, a hollow female locking member having a substantially cylindrical and a substantially conical interior surface, a plate in said female member provided with an opening, a downwardly extending lug to engage with the tooth carried by the head, an upwardly extending lip to coöperate with the locking recess in the head, one of the coupling members being provided with integral trunnions, anti-friction wheels mounted on the trunnions, and the ends of the trunnions being upset to fasten the anti-friction wheels in place.

8. In a device of the character described, a hollow male coupling member having a substantially cylindrical and a substantially conical interior surface, a head having an orifice, a locking tooth, an inclined or wedge surface, and a locking recess, a hollow female locking member having a substantially cylindrical and a substantially conical interior surface, a plate in said female member provided with an opening, a downwardly extending lug to engage with the tooth carried by the head, an upwardly extending lip to coöperate with the locking recess in the head, one of the coupling members being provided with integral trunnions, anti-friction wheels mounted on the trunnions, the ends of the trunnions being upset to fasten the anti-friction wheels in place and guide lugs mounted on the coupling and protecting the tread of the friction wheels.

RICHARD H. VILLARD.

Witnesses:
 JESSIE B. KAY,
 ALAN M. JOHNSON.